United States Patent
Ye et al.

(10) Patent No.: US 11,351,514 B2
(45) Date of Patent: Jun. 7, 2022

(54) PARALLELIZED MULTIPLE NOZZLE SYSTEM AND METHOD TO PRODUCE LAYERED DROPLETS AND FIBERS FOR MICROENCAPSULATION

(71) Applicant: Lawrence Livermore National Security, LLC, Livermore, CA (US)

(72) Inventors: Congwang Ye, Livermore, CA (US); Julie A. Mancini, Livermore, CA (US); Kevin Scott Paulsen, Oakland, CA (US); William Smith, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

(21) Appl. No.: 16/920,083

(22) Filed: Jul. 2, 2020

(65) Prior Publication Data
US 2022/0001347 A1    Jan. 6, 2022

(51) Int. Cl.
*B01J 2/02* (2006.01)

(52) U.S. Cl.
CPC ....................................... *B01J 2/02* (2013.01)

(58) Field of Classification Search
CPC .... B29C 64/112; B01J 2/02; B01J 2/04; A61J 3/07
See application file for complete search history.

(56) References Cited

U.S. PATENT DOCUMENTS

| 7,927,088 B2 * | 4/2011 | Mori ...................... B29B 9/065 |
| | | 425/133.1 |
| 9,895,707 B2 | 2/2018 | Duan et al. |
| 2002/0054912 A1 | 5/2002 | Kim et al. |

(Continued)

FOREIGN PATENT DOCUMENTS

WO    WO-2019169060 A1 *    9/2019    ............ B01F 5/0471

OTHER PUBLICATIONS

Nawar, S., Stolaroff, J.K., Ye, C., Wu, H., Xin, F. and Weitz, D.A., Parallelizable microfluidic dropmakers with multilayer geometry for the generation of double-emulsions. Lab on a Chip, 20(1), 2020, pp. 147-154.

(Continued)

*Primary Examiner* — Joseph S Del Sole
*Assistant Examiner* — Ariella Machness
(74) *Attorney, Agent, or Firm* — Harness, Dickey & Pierce, P.L.C.

(57) ABSTRACT

The present disclosure relates to a nozzle system for use in a microfluidic production application for producing at least one of particles, capsules or fibers. The system has a main body portion having a compressed fluid inlet and a core fluid inlet, and a plurality of parallel arranged core fluid nozzles that receive the core fluid and create a plurality of core fluid streams. At least one compressed fluid inlet associated with the main body channels compressed fluid to areas adjacent ends of the core fluid nozzles. An apertured plate having a plurality of apertures is arranged near the ends of the core fluid nozzles, with each aperture being uniquely associated with a single one of the core fluid nozzles. The compressed fluid acts on the core fluid streams exiting the core fluid nozzles to help create, with the apertures, at least one of core fluid droplets or core fluid fibers from the core fluid streams.

18 Claims, 7 Drawing Sheets

(56) References Cited

U.S. PATENT DOCUMENTS

| | | | |
|---|---|---|---|
| 2013/0177637 A1* | 7/2013 | Schutt | B01F 3/088 |
| | | | 424/450 |
| 2015/0010666 A1* | 1/2015 | Sugiura | B01F 5/0471 |
| | | | 425/6 |
| 2019/0291067 A1 | 9/2019 | Ye et al. | |
| 2020/0316623 A1* | 10/2020 | Velasquez-Garcia | B05B 5/00 |

OTHER PUBLICATIONS

Ganan-Calvo, A.M., Generation of steady liquid microthreads and micron-sized monodisperse sprays in gas streams. Physical review letters, 80(2), 1998, p. 285.

Si, T., Feng, H., Luo, X., & Xu, R. X. (2015). Formation of steady compound cone-jet modes and multilayered droplets in a tri-axial capillary flow focusing device. Microfluid Nanofluid (2015) 18:967-977, DOI 10.1007/S10404-014-1486-8.

Duan, H., Romay, F. J., Li, C., Naqwi, A., Deng, W., & Liu, B. Y. (2016). Generation of monodisperse aerosols by combining aerodynamic flow-focusing and mechanical perturbation. *Aerosol Science and Technology*, 50(1), 17-25, DOI:10.1080/02786826.2015.1123213.

\* cited by examiner

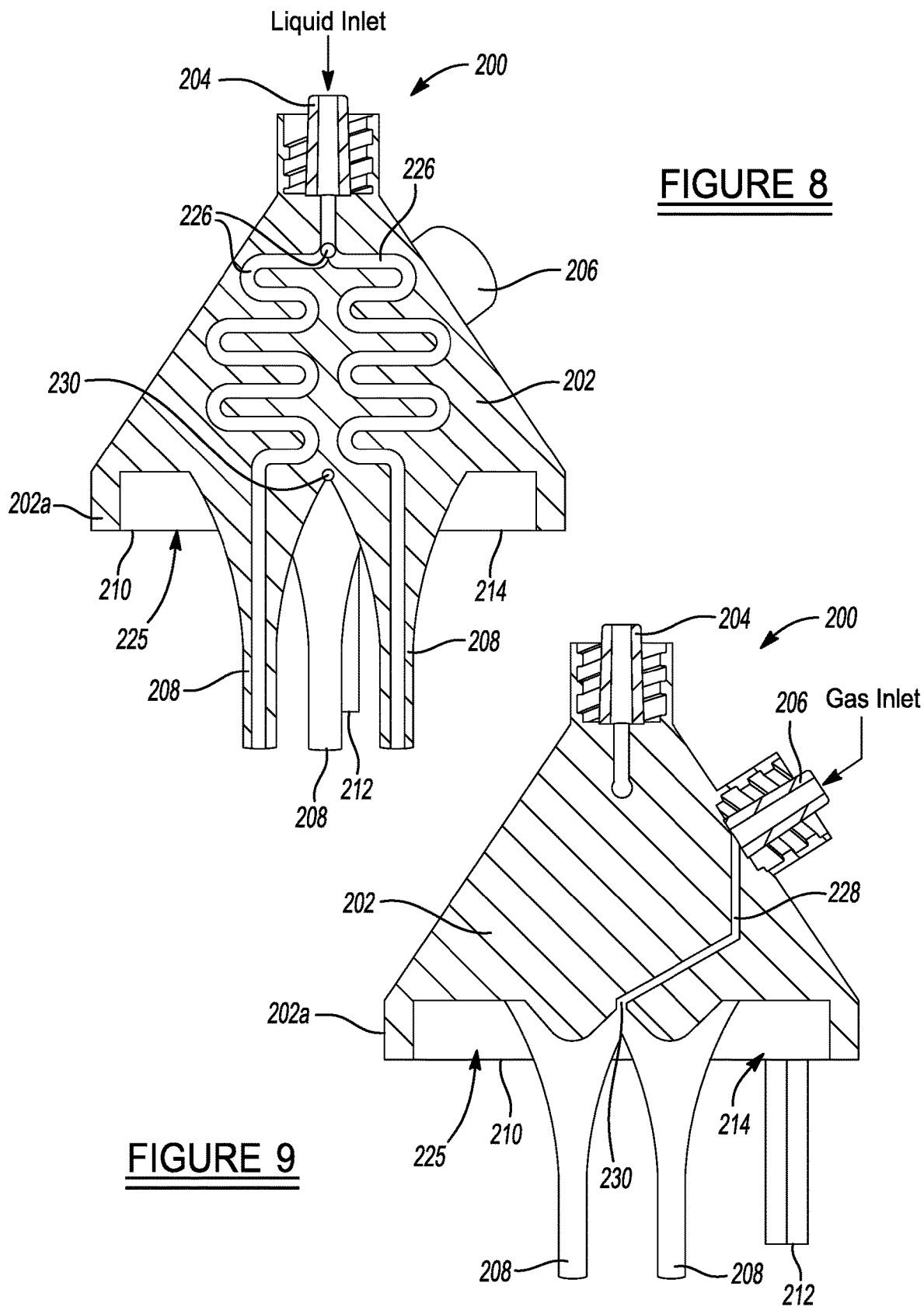

PARALLELIZED MULTIPLE NOZZLE SYSTEM AND METHOD TO PRODUCE LAYERED DROPLETS AND FIBERS FOR MICROENCAPSULATION

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present disclosure relates to systems and methods for producing droplets and fibers for microencapsulation, and more particularly to systems and methods which create parallelized flow streams of droplets which can be used for microencapsulation, or for forming fibers with multiple layers.

BACKGROUND

The statements in this section merely provide background information related to the present disclosure and may not constitute prior art.

Microfluidics has gained significant interest in recent years for use to produce microcapsules for a wide variety of applications including drug delivery, functional particle production, and specialty feedstock materials. Documents involving microfluidic devices and systems include "*Parallelizable microfluidic dropmakers with multilayer geometry for the generation of double emulsions*", S. Nawar et al., Royal Society of Chemistry, Lab Chip, 2020, 20, 147; "*Generation of Steady Liquid Microthreads and Micron-Sized Monodisperse Sprays in Gas Streams*," A. Ganan-Calvo, The American Physical Society, 12 Jan. 1998; U.S. Patent Pub. No. 2002/0054912 to Kim et al.; and U.S. Patent Pub. No. 2019/0291067 A1 to Ye et al. All of the foregoing documents are hereby incorporated by reference into the present disclosure.

A typical microfluidic device for air flow focusing droplet production is shown in FIG. 1. The device includes a coaxial needle "N" which is positioned in a custom holder "H", which forms a chamber. The coaxial needle N in this example has an opening "O" of about 1 mm in diameter. The opening O receives a pressurized fluid such as pressurized air flowing through and leaving a channel C1 of the coaxial nozzle. The channel C1 surrounds a bore "B" through which a core fluid "F" flows. The core fluid F exits the bore B as a fluid jet. The opening O allows pressurized air to pass therethrough, which creates a sufficiently strong shear force to break the fluid jet F into droplets D. The droplets D of fluid F are encapsulated in a shell or layer of the fluid F.

In spite of the recent advancements made regarding microfluidic devices, there remains a strong interest in advancements of systems and methods for creating droplets and fibers for microencapsulation, which lend themselves even better to more consistent creation of droplets. There is also continuing strong interest in the development of microfluidic systems for creating droplets and fibers in significantly greater numbers than heretofore possible with existing microfluidic devices and systems, and also to systems and methods which can be easily disassembled for quick and easy cleaning, and which can be made quick and relatively inexpensively via widely available 3D printing systems and machining techniques.

SUMMARY

This section provides a general summary of the disclosure, and is not a comprehensive disclosure of its full scope or all of its features.

In one aspect the present disclosure relates to a nozzle system for use in a microfluidic production application for producing at least one of particles, droplets, capsules or fibers. The system may comprise a main body portion having a compressed fluid inlet and a core fluid inlet. A plurality of parallel arranged core fluid nozzles may be included which are contained within the main body portion and in communication with the core fluid inlet for creating a plurality of core fluid streams which exit the core fluid nozzles. At least one compressed fluid inlet is included which is associated with the main body for channeling compressed fluid to areas adjacent ends of the core fluid nozzles. An apertured plate may be included which has a plurality of apertures, arranged in proximity to the ends of the core fluid nozzles, with each one of the apertures being uniquely associated with a single one of the core fluid nozzles. The compressed fluid is used to act on the core fluid streams exiting the core fluid nozzles to help create, with the apertures, at least one of core fluid particles, droplets, capsules or core fluid fibers.

In another aspect the present disclosure relates to a nozzle system for use in a microfluidic production application for producing at least one of particles, droplets, capsules or fibers. The system may comprise a main body portion having a compressed fluid inlet, a core fluid inlet and a shell fluid inlet. A plurality of parallel arranged core fluid nozzles is contained within the main body portion and in communication with the core fluid inlet for creating a plurality of core fluid streams which exit the core fluid nozzles. A plurality of shell fluid nozzles is included for receiving a shell fluid injected into the shell fluid inlet and releasing the shell fluid as a stream through each of the shell fluid nozzles. The shell fluid nozzles are formed in proximity to the core fluid nozzles, with each one of said shell fluid nozzles being uniquely associated with a specific one of said core fluid nozzles. At least one compressed fluid inlet is associated with the main body for channeling compressed fluid to areas adjacent ends of the shell fluid nozzles and the core fluid nozzles. An apertured plate is included which has a plurality of apertures, arranged in proximity to the ends of the core and shell fluid nozzles, with each one of the apertures being uniquely associated with a single pair of said shell fluid and core fluid nozzles. The compressed fluid is used to act on the core and shell fluid streams exiting the core fluid nozzles to help create, with the apertures, at least one of core fluid particles, droplets, capsules or core fluid fibers from the core fluid streams.

In still another aspect the present disclosure relates to a nozzle system comprising a main body portion having an axially centered core fluid inlet port at a first end thereof, and a radially offset compressed fluid port. A plurality of core fluid channels is included which are in communication with the core fluid inlet and which extend through the main body portion. A plurality of core fluid nozzles each being singularly associated with one of the core fluid channels, for releasing the core fluid from distal ends of the core fluid nozzles as a plurality of parallel streams of core fluid. A compressed fluid flow channel is formed in the main body portion and is in communication with the compressed fluid inlet, and terminates at an exit port, for channeling the compressed fluid to an area in proximity to the distal ends of the core fluid nozzles. An apertured plate is disposed adjacent the distal ends of the core fluid nozzles. The apertured plate includes a plurality of apertures aligned with the distal ends of the core fluid nozzles for creating at least one of a fluid particles, fluid droplets, fluid capsules or fluid fibers as the core fluid is released from the core fluid nozzles and is acted on by the compressed fluid, and passes through the apertures.

In still another aspect the present disclosure relates to a method for producing parallel streams of at least one of fluid particles, fluid droplets, fluid capsules or fluid fibers from a core fluid, for use in a microfluidic application. The method may comprise using a main body portion to receive a compressed fluid and a core fluid. The method may further include using a plurality of core nozzles associated with the main body portion to create a plurality of parallel core fluid streams which exit distal ends of the core nozzles. The method may further include using the main body portion to receive a compressed fluid and to channel the compressed fluid to areas adjacent the distal ends of the core fluid nozzles. The method may further include using an apertured plate having a plurality of apertures, arranged in proximity to the ends of the core fluid nozzles, together with the compressed fluid, to act on the core fluid streams exiting the core fluid nozzles and passing through the apertures, to create at least one of a plurality of fluid particles, fluid droplets, fluid capsules or fluid streams of core fluid from the core fluid streams.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings, in which:

FIG. 8 is a cross sectional side view of the nozzle assembly in FIG. 7 taken in accordance with section line 8-8 in FIG. 7 showing the internal liquid flow channels formed within a main body portion of the nozzle assembly; and FIG. 9 is a cross sectional side view of the nozzle assembly of FIG. 7 taken in accordance with section line 9-9 in FIG. 7.

DETAILED DESCRIPTION

Example embodiments will now be described more fully with reference to the accompanying drawings.

Figure 1:
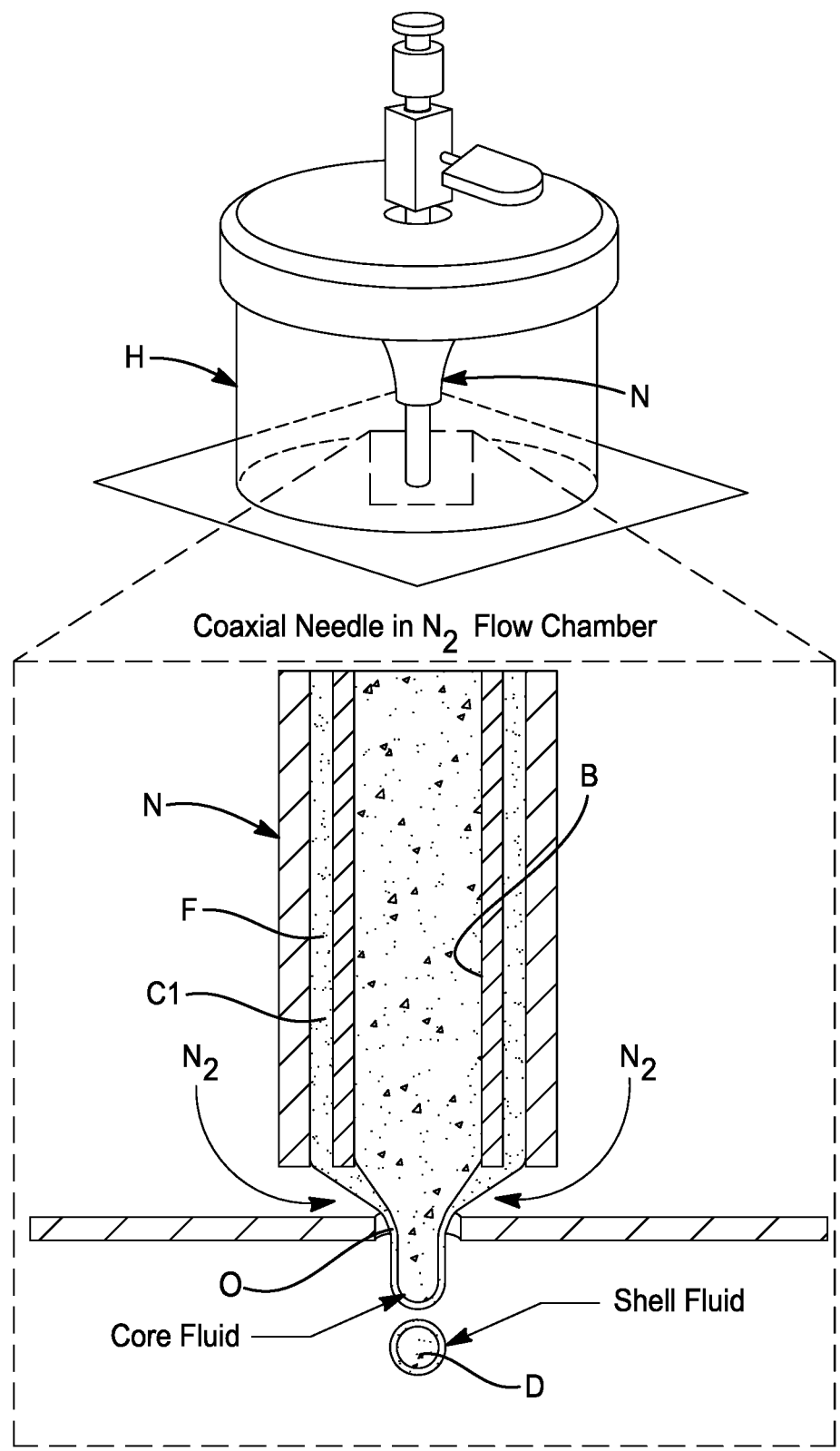
FIG. 1 is a view of a prior art system illustrating how an airflow or gas flow may be used to help create droplets from a fluid (i.e., liquid) stream.
Figure 2:
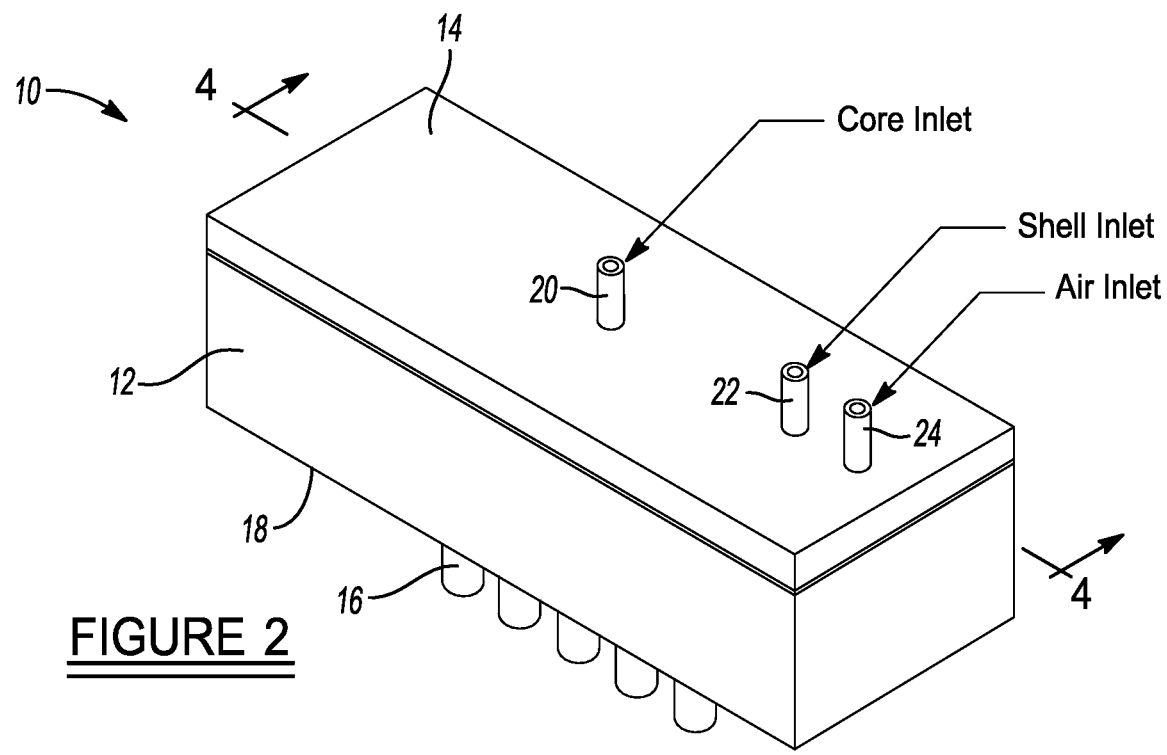
FIG. 2 is a perspective view of one embodiment of the system of the present disclosure in a fully assembled configuration, and wherein the system forms a linear flow configuration.

This present disclosure involves systems and methods for providing a multiple nozzle microfluidic unit that allows simultaneous generation streams of multiple layered coaxial liquid jets. FIG. 2 shows a parallelized nozzle assembly forming a system 10 in accordance with one specific embodiment of the present disclosure. The system 10 may receive liquids which are pumped into the system at a combined flow rate, for example from 10 ml/hour to 10 L/hour. Droplets created by the system 10 may range significantly in size to suit a specific application. In one implementation the droplets may range in size from, without limitation, about 1 µm to 5 mm in diameter. The droplets produced by the system 10 can be created with one or a plurality of shell layers of fluid. As will be described in detail in the following paragraphs, the system 10 makes use of multiple nozzles and can be disassembled for easy cleaning. Droplets created from the system 10 can be UV treated and/or heat treated to turn the droplets into hard/soft capsules and particles. By changing fluid flow rates and liquid pinching parameters, the system 10 can also be used to simultaneously produce a plurality of fibers, with each fiber having multiple sheath layers. Depending on the properties of the specific chemicals processed, the system may be used to distribute fluids radially, linearly or hierarchically (i.e., in a branched configuration), or even in some engineered combination of linear, and/or radial and/or hierarchical streams.

Referring to FIG. 2, the system 10 in this embodiment forms a "linear", parallelized, flow forming device which can be seen to include a main body portion 12 with a cover 14. The cover 14 is preferably secured with a suitable seal or gasket to form an airtight seal or a substantially airtight seal. A plurality of parallel-arranged nozzle assemblies 16 extend out from a lower surface 18 of the main body portion 12. The nozzle assemblies 16 produce droplets or liquid streams, as will be described in greater detail in the following paragraphs. A first inlet port forms a "core" inlet port 20 for receiving a core fluid. A second inlet port forms a "shell" fluid inlet port 22 for receiving a shell fluid. A third inlet port forms an air or gas fluid input port 24 for receiving an air or gas, which is typically a compressed air or compressed gas flow. Merely for convenience, the following discussion will reference the use of compressed air as the medium which is introduced into the fluid inlet port 24, although it will be appreciated that any other compressible, flowing gas (e.g., compressed nitrogen) could be used rather than compressed air.

Figure 3:
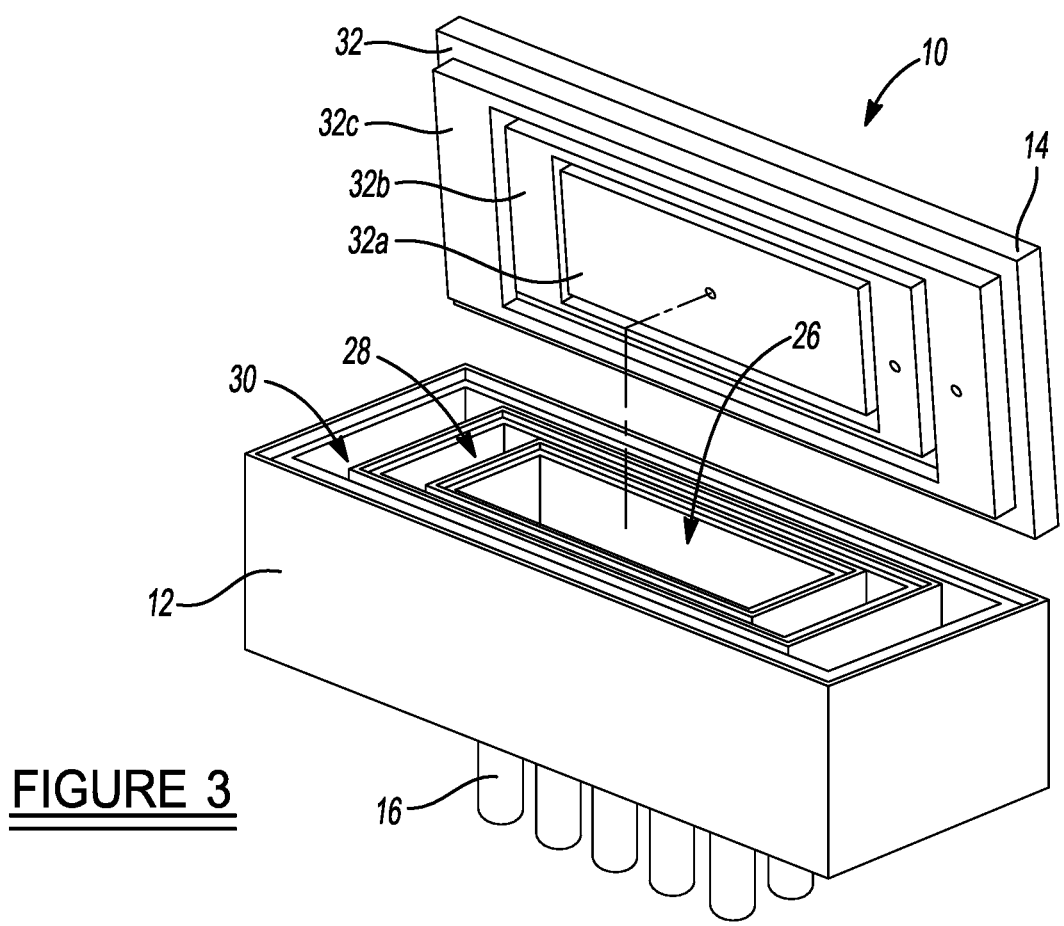
FIG. 3 is a perspective view of the system of FIG. 2 but with a cover removed from a main body portion, revealing the concentric arrangement of flow chambers that form the main body portion.

Referring to FIG. 3, the interior configurations of the main body portion 12 and the cover 14 are visible. The main body portion 12 in this embodiment of the system 10 includes an inner liquid chamber or reservoir 26, a shell fluid chamber 28 arranged concentrically around the inner liquid chamber 26, and an outer air or gas chamber 30 arranged concentrically around the shell fluid chamber 28. Again, for convenience, the air or gas chamber 30 will be referred to simply as the "air chamber 30".

With further reference to FIG. 3, an inside surface of the cover 14 includes a first portion 32c which is shaped to overlay, and in this example to project slightly into, the air chamber 30. A second surface 32b overlays, and may project slightly into, the shell fluid chamber 28. A third surface 32a may overlay and project slightly into the inner liquid chamber 26. Once the cover 14 is attached to the main body portion 12, the upper ends of the three chambers 26, 28 and 30 are sealed from one another. As such, compressed air directed into the air chamber 30 through the air inlet port 24 only flows into the air chamber 30, the shell fluid flowing in through the shell inlet port 22 only flows into the shell chamber 28, and the liquid entering through the core inlet port 20 only flows into the inner liquid chamber 26. While no gaskets or O-ring type seals are shown in FIGS. 2 and 3 to avoid cluttering the figures, such components may optionally be included to help form a fluid tight seal between the cover 14 and the main body portion 12.

Figure 4:
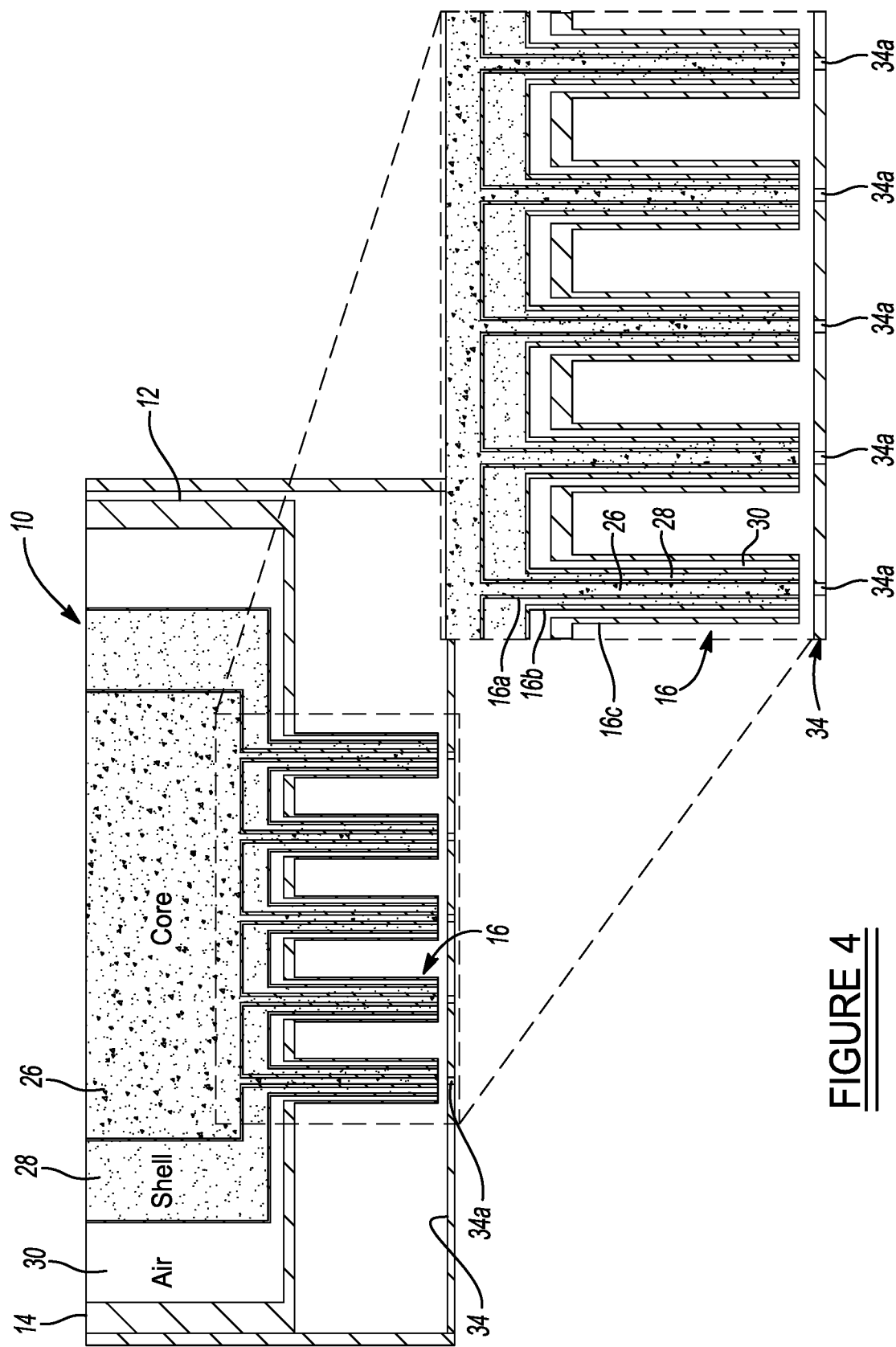
FIG. 4 is a partial cross sectional view of the system of FIG. 2 taken in accordance with section line 4-4 in FIG. 2, showing the construction of the nozzle assemblies in greater detail.

Referring to FIG. 4, the construction of each nozzle assembly 16 can be seen in greater detail. Each nozzle assembly 16 includes an inner core fluid nozzle portion 16a which communicates with the inner liquid chamber 26 to receive core fluid from the inner liquid chamber 26. A concentric shell fluid nozzle portion 16b surrounds the inner core fluid nozzle portion 16a and communicates with the shell fluid chamber 28 to receive shell fluid contained in the shell fluid chamber 28. An outer concentric airflow nozzle portion 16c communicates with the air chamber 30 to receive compressed air from the air chamber 30. Compressed air is directed at the ends of each of the core fluid nozzle and the shell fluid nozzle portions 16a and 16b, respectively, to help shear the core fluid stream to create multilayer droplets from the core/shell fluid stream. A plate 34 including apertures 34a aligned with each nozzle assembly 16 is also shown positioned closely adjacent the distal portions of the nozzle assemblies 16. In one specific implementation the plate 34 has a thickness of about 250 µm and is spaced about 500 um from the distal ends of the nozzle assemblies 16, although these dimensions may vary to suit the needs of specific applications. In this embodiment the plate 34 does not form an integral portion of the system 10, however, the system 10 could readily be modified to include the plate 34 as part of the main body portion 12. The apertures 34a each have a diameter selected to tune the size of the droplets formed by the core fluid and the shell fluid being released from each of the nozzle assemblies 16. In one embodiment the apertures 34a are each about 1 mm in diameter, although this dimension may be varied significantly to meet the needs of a particular implementation. It is also contemplated that the system 10 may just include the structures for the core and shell liquids, and that the pressurized fluid (e.g., air) may be provided via a chamber structure (plus the plate 34).

While the three nozzle portions 16a, 16b and 16c are shown as perfectly concentric with one another in the system 10, with the nozzle portions 16b and 16c formed as perfectly round, annular flow paths, this is not necessarily required. The cross-sectional shapes of the nozzle portions 16a, 16b and 16c may be tailored to meet the needs of specific applications. By simply enlarging the main body portion 12 and the cover 14, a greater number of nozzle assemblies 16 can be incorporated. In the system 10, the core fluid nozzle portion 16a, the shell fluid nozzle portion 16b and the compressed airflow nozzle portion 16c also all terminate at a common distance from the apertured plate 34. However, in some implementations the lengths of the nozzle portions 16a, 16b and 16c may be unequal to further tailor the formation of the droplets as needed for a particular application.

The system 10 forms a "linear" flow producing device in that the nozzle assemblies 16 are arranged linearly with or, put differently, extend linearly from, the chambers 26, 28 and 30. This configuration forms an especially compact, spatially efficient arrangement with a minimum of fluid flow turns.

In some specific implementations, the inner diameter of the core fluid nozzle portion 16a may be between about 0.1 mm-5 mm, and in one specific implementation 1.0 mm. In some embodiments the core fluid nozzle portion 16a and the shell fluid nozzle portion 16b may each have wall thicknesses between about 10 µm-1000 µm, and in one specific implementation these wall thicknesses may be 500 µm. The cross-sectional flow openings formed by the shell fluid nozzle portion 16b and the airflow nozzle portion 16c may also vary considerably to suit the needs of a specific implementation, but in one example these dimensions may be between 0.2 mm-7 mm. It will be appreciated that, typically, the airflow nozzle portion 16c is smaller than the shell fluid nozzle portion 16b, although the present disclosure is not limited to such a configuration.

Figure 5:
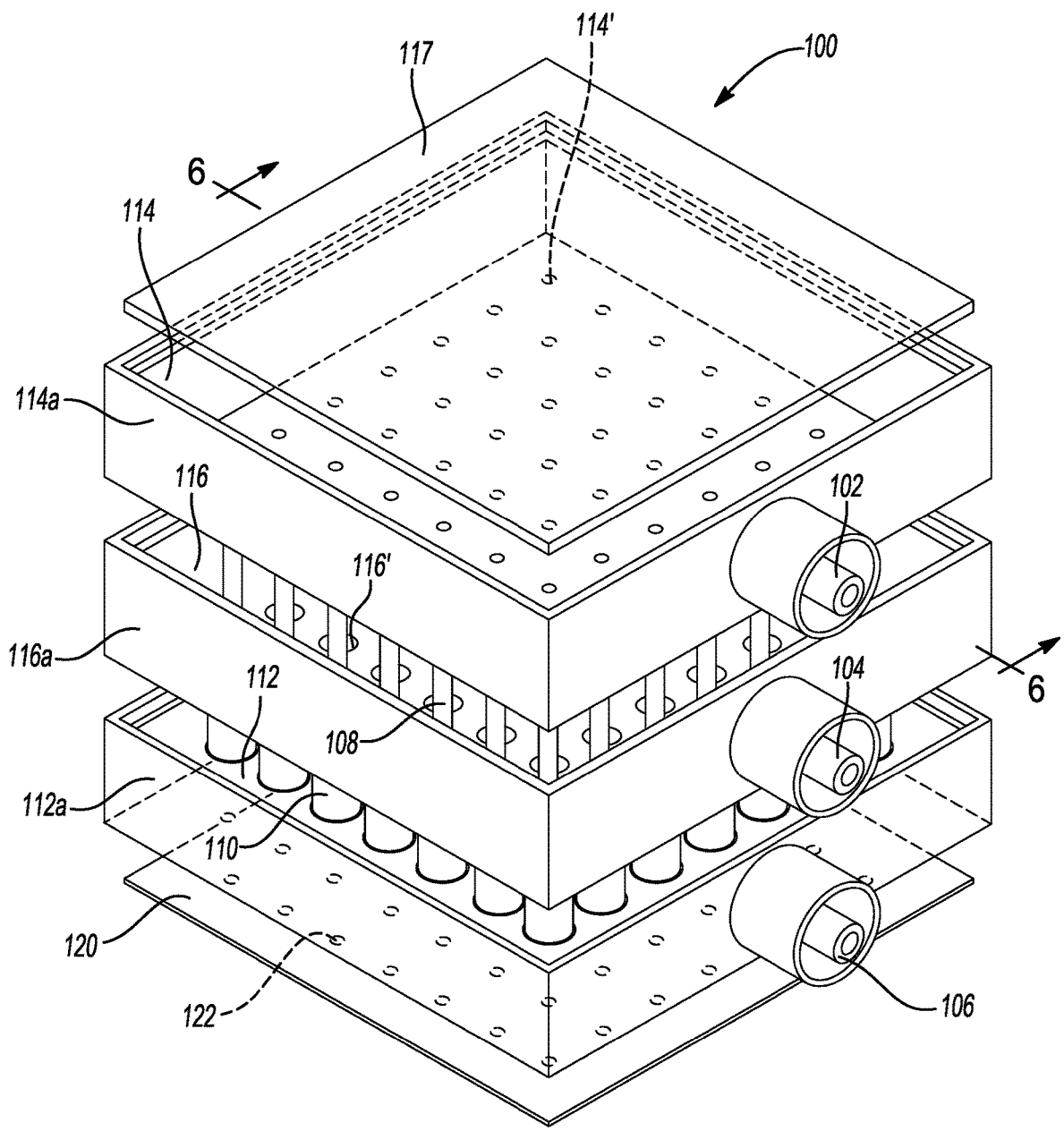
FIG. 5 is an exploded perspective view of another embodiment of the present disclosure in which the compressed air, the core fluid and the shell fluid are all injected along axes which in this example are perpendicular to the orientation of the core nozzle and the shell fluid nozzle (but need not be perpendicular)

Referring to FIG. 5, a system 100 in accordance with another embodiment of the present disclosure is shown. The system 100 in this example creates a turn for each of the air/fluid flow paths, and in this specific example the turn forms a 90 degree turn. It will be appreciated, however, that other turning angles could be used, and the present disclosure is not limited to just using a 90 degree turn for each of the air/fluid flow paths through the system 100. This is accomplished by forming a core liquid inlet 102, a shell fluid inlet 104 and a compressed fluid inlet 106 to extend at right angles from a plurality of core fluid nozzles 108, a plurality of shell fluid nozzles 110 and a compressed fluid chamber 112, respectively. The core liquid inlet 102 communicates with a core fluid tray 114a forming a core fluid chamber 114 with a plurality of holes 114', while the shell fluid inlet 104 communicates with a tray 116a forming a shell fluid chamber 116 having a plurality of holes 116', and the compressed fluid inlet 106, which in one example communicates compressed air, communicates with a tray 112a forming the compressed fluid chamber 112. The shell fluid tray 116a sits concentrically within the compressed fluid tray 112a, and the core fluid tray 114a sits concentrically within the shell fluid tray 116a. A cover 117 may be attached to the core fluid tray 114a.

Figure 6:
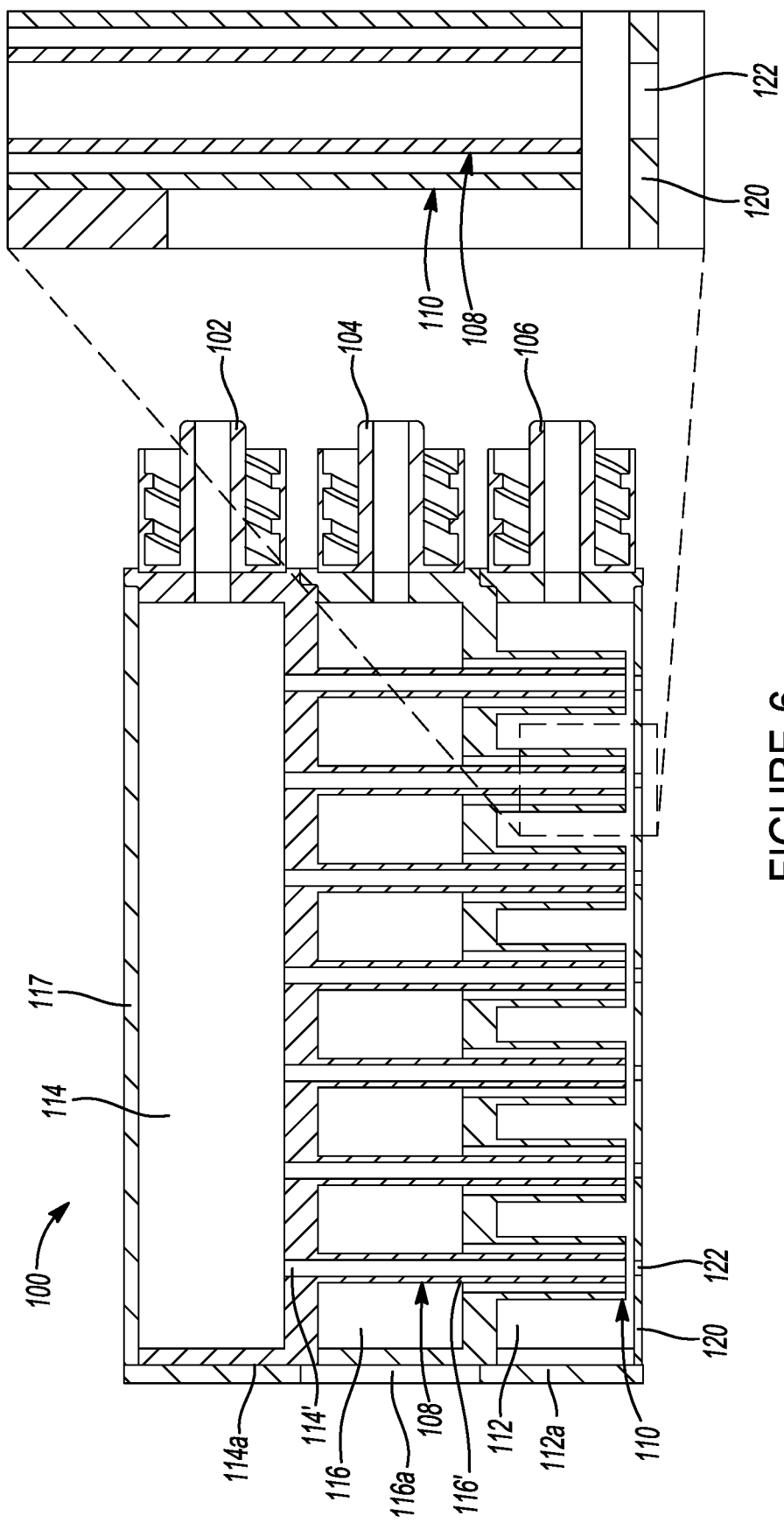
FIG. 6 is a cross sectional side view of the nozzle system of FIG. 5 taken in accordance with section line 6-6 in FIG. 5, with one of the nozzle assemblies shown in highly enlarged form.

While the chambers 114, 116 and 112 are shown as square shaped, the system 100 is not limited to only a square shape, and round, rectangular or other shapes may be used to form the three chambers 114, 116 and 112 without departing from the scope of the present disclosure. A bottom plate 120 with a plurality of apertures 122 is arranged under the compressed fluid chamber 112. Each one of the apertures 122 is associated with a single one of the core fluid nozzles 108 and is centered along an axial center of its associated core fluid nozzle 108. The spacing of the bottom plate 120 and the dimensions of the apertures 122 may be as discussed with respect to the system 10, or may vary as needed to suit a specific application. FIG. 6 shows the concentric arrangement of the nozzles 108 and 110.

The concentric construction of the core fluid nozzle 108, the shell fluid nozzle 110 and the airflow chamber 112, which cooperatively form a nozzle assembly, can also be seen in FIG. 6. It will be noted that with the system 100, there is no distinct compressed airflow nozzle element, such as airflow nozzle 16c of the system 10. Rather, the entire volume of compressed air is fed into the compressed fluid chamber 112 and helps to "shear" the fluid streams leaving the core fluid nozzle 108 and the shell fluid nozzle 110 into droplets as the fluid streams pass through the apertures 122 in the bottom plate 120. In some applications, the 90 degree flow arrangement of the system 100 may be more advantageous by providing benefits in space saving, pathway organization, or possibly ease of use.

Figure 7:
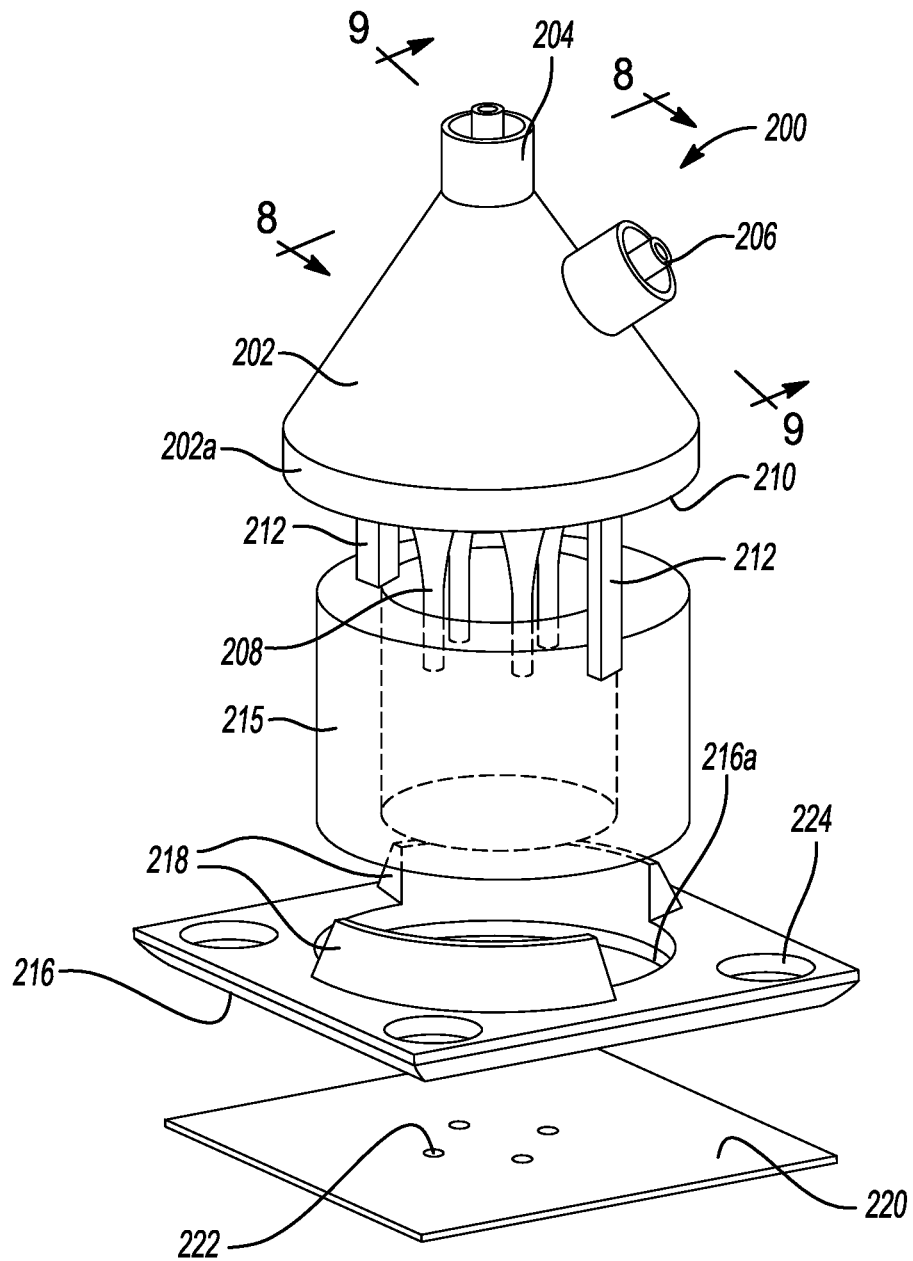
FIG. 7 is a perspective view of a nozzle assembly in accordance with another embodiment of the present disclosure.

Referring to FIGS. 7-9, a nozzle system 200 in accordance with another embodiment of the present disclosure is shown. The system 200 in this example may be formed from a 3D printing operation or machining tools to have a main body portion 202 with a core fluid inlet 204 and a compressed fluid (e.g., compressed air or other gas, possibly nitrogen) airflow inlet 206 in communication with the main body portion 202, and where the compressed fluid inlet is angularly (i.e., radially) offset from the core fluid inlet 204. In this example the main body portion is frusto-conical in shape, although other cross-sectionally diverse shapes are certainly possible, and this embodiment is therefore not limited to only a frusto-conical shape. The core fluid inlet 204 is located at an axial center of the main body portion 202, although this location could be varied as well.

The main body portion 202 includes a plurality of nozzles 208 depending from an underside 210 of thereof. At least one, and more preferably a pair of, alignment arms 212 also depend from the underside 210 of the main body portion. An annular recess 214 is also formed which helps define the underside 210, and the nozzles 208 are generally configured so as to be relatively evenly spaced from one another and extending outwardly from within the annular recess 214. A tube-like section 215 has an inner diameter sufficiently large to permit the nozzles 208 and the alignment arms 212 to project there into, and an outer diameter similar or identical to the an inner diameter of a lower lateral edge 202a of the main body portion 202.

FIG. 7 expressly shows a mounting plate 216 on which the main body portion 202 may be mounted. The mounting plate 216 includes at least one, and more preferably a pair of, upstanding circumferential locating flanges 218, and a centrally located opening 216a. The alignment arms 212 engage within the spaces between the locating flanges 218 to help orientate the main body portion in a predetermined, desired orientation. An apertured plate 220 with apertures 222 is disposed below the mounting plate 216 and may be coupled to the mounting plate 216 by suitable structure (e.g., threaded bolts and nuts, or even by magnetic fixtures or coupling arrangements) using openings 224 in the mounting plate 216. Thus, once the main body portion 202 is coupled to the mounting plate 216 and the apertured plate 220 is coupled to the mounting plate 216, the nozzles 208 will be aligned over the apertures 222. The tube-like section 215 encloses all of the nozzles 208 and, together with the annular recess 214 and the apertured plate 220, helps to define a compressed fluid chamber 225.

FIG. 8 illustrates that the main body portion 202 includes a plurality of core fluid flow channels 226 formed therein, and in this specific example four such core fluid flow channels 226, which are each in communication with a respective one of the four core fluid flow nozzles 208, and with the core fluid inlet 204. As such, the core fluid injected into the core fluid inlet 204 may be distributed, in this example evenly through the core fluid flow channels 226, between each of the core fluid nozzles 208. In some applications it may be desirable to distribute the core fluid unevenly, and for that purpose different diameter flow channels 226 may be used, rather than having all the flow channels 226 formed with a uniform diameter and shape.

FIG. 9 shows a compressed fluid flow channel 228 formed in the main body portion 202 which communicates with the compressed fluid inlet 206, and which terminates, in this example, at a coaxially centered exit port 230 in the annular recess 214 of the underside 210. However, it will be appreciated that the exit port 230 need not necessarily be coaxially centered in the main body portion 202, and other locations are possible. The compressed fluid is distributed within the compressed fluid chamber 225 formed between the apertured plate 220 and the annular recess 214 and pressurizes the compressed fluid chamber, which provides the compressed fluid flows needed to create the shearing of the fluid streams exiting the core fluid nozzles 208. And while only four core fluid nozzles 208 are shown in FIGS. 7-9, it will be appreciated that a greater or lesser number of core fluid nozzles and corresponding core fluid flow paths 226 may be used to meet the needs of a specific application.

From the foregoing it will be appreciated that the various embodiments of the present disclosure all provide nozzle assemblies which enable parallelized fluid flow streams to be simultaneously created from a single nozzle system. The various embodiments may be used to create particles, droplets, capsules or fibers from the fluid streams. The flow streams may be sheared into particles or droplets of a core fluid, or sheared into droplets or particles of a core fluid encapsulated within a shell fluid (e.g., layered droplets having a shell which is curable such as by UV light, or otherwise curable through heat or evaporation). Still further, the fluid streams produced by the parallel arrange of nozzles may be used to create fibers from one or more fluids (i.e., fibers consisting of just a core fluid or fibers consisting of a core fluid and an outer shell component). Embodiments providing a linear flow and a non-linear (e.g., right angle or other angle) flow configuration are presented which are expected to help to tailor the various embodiments for use with different types of manufacturing settings and equipment The linear flow configuration may be more useful for UV crosslinking systems, as the UV lamp is usually located on one side of the apparatus setup, and then shining a line to one direction. The system 100 of FIG. 5, while being useable with a UV system as well, would have a variation due to the shadowing effect of streams blocking UV light from each other. So the system 100 is more appropriate for thermal curing polymer or solvent evaporation types of applications.

The various embodiments 10, 100 and 200 may be configured with minor modifications to distribute fluids not just linearly, but radially or even in a hierarchical pattern The various embodiments disclosed herein may therefore be used, without limitation, with at least the following types of configurations: a core fluid pre-emulsified with shell fluid polymer and then used as one single phased sheared by air; a configuration with additional 1 to 2 shell fluid layers; or a configuration with just the core fluid so only droplets will form and be used.

The various components of the systems 10, 100 and 200 may be formed from any suitable materials, for example and without limitation, various plastics or metals, ceramics, etc., through 3D printing operations or other more conventional manufacturing processes. The precise materials used may be dictated in part by the types of core and shell fluids used, as well as the specific type of manufacturing process used to make the system. A particular advantage of the various embodiments disclosed herein is that all are easily disassembled for cleaning purposes.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A nozzle system for use in a microfluidic production application for producing at least one of particles, droplets, capsules or fibers, the system comprising:
   a main body portion having at least one compressed fluid inlet and a core fluid inlet;
   the core fluid inlet communicating with a core fluid chamber;
   a compressed fluid chamber arranged concentrically with the core fluid chamber to surround the core fluid chamber;
   a plurality of parallel arranged core fluid nozzles contained within the main body portion and in communication with the core fluid inlet, and extending through the compressed fluid chamber, for creating a plurality of core fluid streams which exit the core fluid nozzles;
   the at least one compressed fluid inlet associated with the main body portion being configured to channel compressed fluid into the compressed fluid chamber, and through the compressed fluid chamber to areas adjacent ends of the core fluid nozzles;
   an apertured plate having a plurality of apertures, arranged in proximity to the ends of the core fluid nozzles, each one of said apertures being independently associated with a single one of the core fluid nozzles; and
   the compressed fluid flowing out through the compressed fluid chamber and being used to act on the core fluid streams exiting the core fluid nozzles to help create, with the apertures, at least one of core fluid droplets or core fluid fibers from the core fluid streams.

2. The nozzle system of claim 1, where the main body portion further includes:
   a shell fluid inlet for receiving a shell fluid; and
   at least one shell fluid nozzle disposed in proximity to one of the core fluid nozzles, and in proximity to one of the apertures, for releasing a flow of the shell fluid which encapsulates the droplets or the core fluid stream exiting the one of core fluid nozzles.

3. The nozzle system of claim 2, wherein:
   the core fluid chamber communicates with the core fluid inlet and the core fluid nozzle; and
   wherein the nozzle system further includes:

a shell fluid chamber in communication with the shell fluid inlet and with the at least one shell fluid nozzle; and the compressed fluid chamber communicates with the compressed fluid inlet and with the apertures of the aperture plate.

4. The nozzle system of claim 3, wherein the shell fluid chamber is arranged concentrically around the core fluid chamber to surround the core fluid chamber.

5. The nozzle system of claim 4, further comprising at least one compressed fluid nozzle arranged concentrically around the at least one shell fluid nozzle, the at least one compressed fluid nozzle being in communication with the compressed fluid chamber and configured to direct the compressed fluid from the compressed fluid chamber into a path of the shell fluid and the core fluid exiting the at least one shell fluid nozzle and the at least one core fluid nozzle.

6. The nozzle system of claim 5, wherein the compressed fluid nozzle, the core fluid nozzle and the shell fluid nozzle terminate at a common distance from the apertured plate.

7. The nozzle system of claim 1, wherein the core fluid inlet and the compressed fluid inlet extend co-linearly with the core fluid nozzles.

8. The nozzle system of claim 1, wherein the core fluid inlet and compressed fluid inlet are arranged non-parallel to the core fluid nozzles.

9. The nozzle system of claim 8, wherein the core fluid inlet and the compressed fluid inlet are arranged at angles so as to be non-parallel to the core fluid nozzles.

10. The nozzle system of claim 1, further comprising a compressed fluid channel formed in the main body portion for channeling the compressed fluid through the main body portion, and wherein the compressed fluid channel terminates at a point which is centrally located relative to the core fluid nozzles.

11. The nozzle system of claim 1, wherein the main body portion comprises a three dimensional manufactured main body portion.

12. A nozzle system for use in a microfluidic production application for producing at least one of particles, droplets, capsules or fibers, the system comprising:
a main body portion having a compressed fluid inlet, a core fluid inlet and a shell fluid inlet;
a core fluid chamber;
a plurality of parallel arranged core fluid nozzles contained within the main body portion and in communication with the core fluid inlet, and extending from the core fluid chamber, for creating a plurality of core fluid streams which exit the core fluid nozzles;
a shell fluid chamber arranged concentrically around the core fluid chamber;
a plurality of shell fluid nozzles for receiving a shell fluid injected into the shell fluid inlet and into the shell fluid chamber, and releasing the shell fluid as a stream through each of the shell fluid nozzles, the shell fluid nozzles being formed in proximity to the core fluid nozzles, with each one of the shell fluid nozzles being independently associated with a specific one of the core fluid nozzles;
a compressed fluid chamber arranged concentrically around the shell fluid chamber;
at least one compressed fluid inlet associated with the main body portion for channeling a compressed fluid into the compressed fluid chamber and from the compressed fluid chamber to areas adjacent ends of the shell fluid nozzles and the core fluid nozzles;

an apertured plate having a plurality of apertures, arranged in proximity to the ends of the core fluid nozzles and the shell fluid nozzles, each one of the apertures being independently associated with a single pair of said shell fluid and core fluid nozzles; and the compressed fluid being used to act on the core and shell fluid streams exiting the core fluid nozzles to help create, with the apertures, at least one of core fluid particles, droplets, capsules or core fluid fibers from the core fluid streams.

13. The nozzle system of claim 12, further comprising a plurality of compressed fluid nozzles in communication with the compressed fluid inlet, each one of the compressed fluid nozzles being independently associated with one said pair of the shell fluid and core fluid nozzles.

14. The nozzle system of 13, wherein each one of the shell fluid nozzles is arranged concentrically around an associated one of the core fluid nozzles.

15. The nozzle system of claim 14, wherein each one of the compressed fluid nozzles is arranged concentrically around an associated one of the shell fluid nozzles.

16. The nozzle system of claim 15, further comprising a plurality of compressed fluid nozzles, each said compressed fluid nozzle being formed concentrically around a single associated pair of said shell and core nozzles.

17. A nozzle system comprising:
a main body portion having an axially centered core fluid inlet port at a first end thereof, and a radially offset compressed fluid inlet port;
a core fluid chamber formed within the main body portion;
a plurality of core fluid channels in communication with the core fluid inlet port and extending outwardly from the core fluid chamber, and through the main body portion;
a plurality of core fluid nozzles each being singularly associated with one of the core fluid channels, for releasing a core fluid from distal ends of the core fluid nozzles as a plurality of parallel streams of core fluid;
a compressed fluid chamber concentrically arranged around the core fluid chamber;
a compressed fluid flow channel formed in the main body portion and in communication with the compressed fluid inlet port and the compressed fluid chamber, and terminating at an exit port, for channeling a compressed fluid received within the compressed fluid chamber to an area in proximity to the distal ends of the core fluid nozzles; and
an apertured plate disposed adjacent the distal ends of the core fluid nozzles, the apertured plate including a plurality of apertures aligned with the distal ends of the core fluid nozzles for creating at least one of a fluid particles, fluid droplets, fluid capsules or fluid fibers as the core fluid is released from the core fluid nozzles and is acted on by the compressed fluid exiting the exit port, and passes through the apertures.

18. The nozzle system of claim 17, wherein the main body portion includes at least one alignment arm, and
the nozzle system further includes a mounting plate having at least one locating flange angularly arranged to engage the alignment arm to hold the main body portion in a predetermined orientation relative to the apertured plate.

* * * * *